United States Patent Office 3,534,562
Patented Oct. 20, 1970

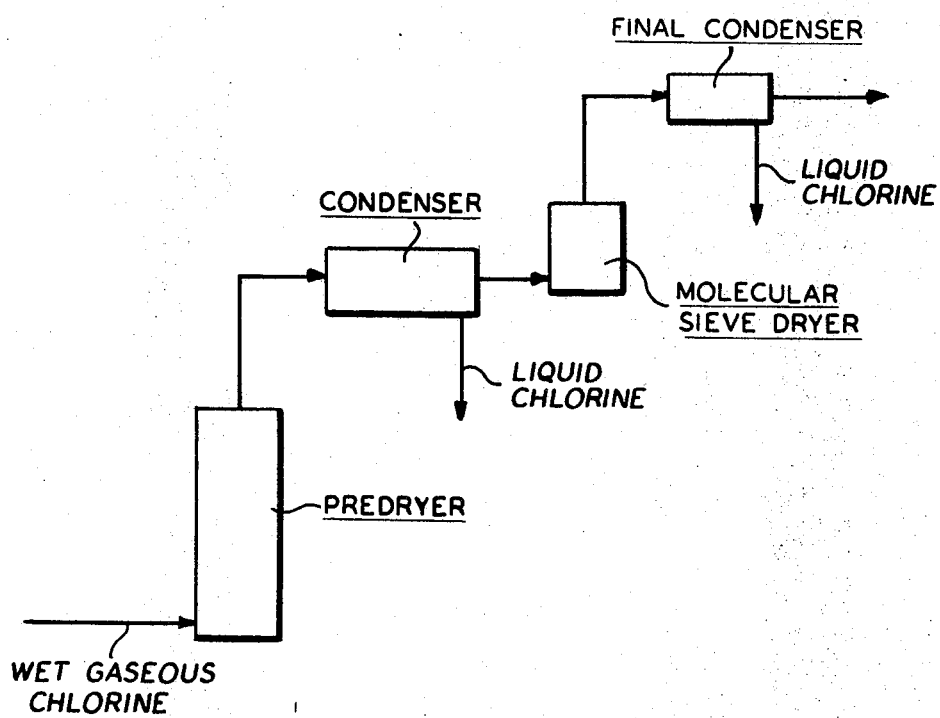

3,534,562
METHOD OF LIQUEFYING GASEOUS CHLORINE CONTAINING WATER VAPOUR
Dick Meyer Timmerman Thijssen, Hengelo, Netherlands, assignor to N.V. Koninklujke Nederlandsche Zoutindustrie, Hengelo, Netherlands, a Dutch company
Filed Apr. 14, 1967, Ser. No. 630,844
Int. Cl. F25j 3/00; B01d 15/04; C01b 7/02
U.S. Cl. 62—18                            1 Claim

ABSTRACT OF THE DISCLOSURE

The method for liquefying gaseous chlorine comprises the steps of moderately drying the gas, subjecting the moderately dried gas to partial condensation, drying the gaseous vapor phase, and then condensing the chlorine.

---

This invention relates to an improved method for producing liquid chlorine.

In liquefying gaseous chlorine manufactured, for example, by a chlorine-alkali electrolysis, usually the gas is dried first to minimize corrosion of conduits and apparatus in the further processing. Generally, sulfuric acid is used for the drying operation; the gaseous chlorine to be condensed may be contacted with the acid in one or more steps in countercurrent relationship (see, for example, Ind. Eng. Chem. 45 (1953), 1832–1833). By such drying step, the water content of the gas to be condensed can be easily reduced to about 100 mol p.p.m. (100 moles of water to $10^6$ moles of gaseous chlorine).

When high pressures and/or low temperatures are used in one or more of the condensation steps so as to liquefy as great a portion of the gaseous chlorine as possible, as a rule a more effective drying operation is required to avoid corrosion phenomena and the formation of solid chlorine hydrate which may cause clogging of the apparatus, respectively. However, a drying operation which is extended sufficiently to reduce the water content of the gas to 10 p.p.m., for example, can only be obtained at the expense of a rather high use of sulfuric acid or by using a drying installation having several stages and, thus, is rather expensive.

It is, therefore, an object of the present invention to provide an improved method of liquifying gaseous chlorine including drying of the gaseous phase in a more efficient and useful manner. The invention is based on the concept that the difficulties caused by water vapour present in gaseous chlorine can be avoided with greater certainty and with lower costs when after partial condensation of the chlorine the gas is subjected to a second intermediate drying step than when the total gas stream is more effectively dried in a drying operation preceding the condensation.

By carrying out a second drying operation after partial condensation of the chlorine the drying as a whole becomes very effective, especially since over a large temperature range the water content of a chlorine vapour phase which is in equilibrium with liquid chlorine appeared to be about four times as great as the water content of the liquid phase. Consequently, in the partial condensation the water is concentrated in the non-condensed portion of the gas which facilitates the removal of the water to the desired low content.

In accordance with the above, the invention relates to a method of liquifying gaseous chlorine containing water vapor which consists of moderately drying the gaseous chlorine, partially condensing the chlorine, drying the gaseous phase and then finally condensing the chlorine. The term, moderately drying, means conventional drying, for example to 100 p.p.m. The term condensing includes both compression and condensation, it being recognized that convention processing usually includes two stage condensation with the first stage being primarily a compression stage and the second stage being primarily a condensation stage for the processed gas under pressure.

In this way not only is the water left in the moderately dry gas withdrawn from the gas stream but also the water is prevented from accumulating in the installation when the gas stream is contacted in an intermediate step (for example between two compression steps or between the compression section and the condensation section) with liquid chlorine—which always still contains a certain amount of water—so as to cool the gas or to obtain other effects as, for example, those disclosed in the British specification 972,110.

The second drying operation can be effected in any manner known per se for drying chlorine, for example by means of sulfuric acid or other drying agents, such as alumina and silicagel. Good results have been obtained by using zeolites known as so aclled molecular sieves. It has been found that when using such a molecular sieve a loading degree of more than 10% by weight of water could be reached with an excellent selectivity. A drying tower filled with such a zeolite can be simply interposed between two condensers, and the gaseous chlorine discharged from the first of said condensers can be passed therethrough.

BRIEF DESCRIPTION OF THE DRAWING

The single figure of drawing is schematic representation of the liquefaction process of the present invention.

EXAMPLE

Gaseous chlorine which had been moderately predried with sulfuric acid to a maximum water content of 50 mol p.p.m. and had been compressed to an absolute pressure of 9 atmospheres, was partially condensed at 25° C. in a first condenser. The water content in the gas discharged from the condenser increased to about 150 mol p.p.m. Prior to being supplied to a next condenser for further condensation at the same pressure and at −30° C., the gas was passed through a pressure vessel having a volume of 500 litres and filled with 200 kgs. of an acid resistant zeolite sold by Union Carbide Corporation under the indication A.W. 300 and having a pore diameter of about 3 angstrom. Thereby the water content of the gas was reduced to about 20 mol p.p.m. Only after the zeolite had absorbed more than 25 kgs. of water, a raise in the water content of the gas discharged from the pressure vessel was observed. Thereafter, the zeolite was regenerated by means of hot air having a temperature of 300–400° C.

What is claimed is:

1. A method of liquefying gaseous chlorine containing water vapour, wherein the gas is predried and subsequently is condensed in at least two steps, characterized in that the gas is subjected to a second drying operation interposed between the first and the last condensation step, characterized in that the second drying opertaion is effected by passing the gas through a molecular sieve, the first condensing step being performed at a temperature of approximately 25° C. and the second condensing step being performed at approximately −30° C.

(References on following page)

References Cited

UNITED STATES PATENTS

| | | | |
|---|---|---|---|
| 491,699 | 2/1893 | Cutten | 62—18 |
| 1,913,628 | 6/1933 | Falkenberg. | |
| 1,431,981 | 10/1922 | Richter | 55—29 |
| 2,910,140 | 10/1959 | Bencker et al. | 55—29 |
| 3,230,724 | 1/1966 | Havas | 62—11 XR |
| 3,283,476 | 11/1966 | Honigh | 55—30 |
| 3,359,744 | 12/1967 | Bolez | 62—18 XR |
| 3,360,944 | 1/1968 | Knapp et al. | 62—18 XR |

OTHER REFERENCES

Industrial and Engineering Chemistry, vol. 45 (1953), Plant Processes—Chlor-Alkali Production, pp. 1832–1833.

NORMAN YUDKOFF, Primary Examiner

N. MULLEN, Assistant Examiner

U.S. Cl. X.R.

23—219, 293; 62—9; 55—30, 75; 203—87